United States Patent
Petz

(10) Patent No.: US 11,344,837 B2
(45) Date of Patent: May 31, 2022

(54) FILTER ELEMENT FOR FILTRATION OF EXHAUST GASES OR PROCESS GASES AND METHOD FOR MANUFACTURING SUCH FILTER ELEMENT

(71) Applicant: RATH GMBH, Mönchengladbach (DE)

(72) Inventor: Martin Petz, Krummnussbaum (AT)

(73) Assignee: RATH GmbH, Mönchengladbach (DE)

( * ) Notice: Subject to any disclaimer, the term of this patent is extended or adjusted under 35 U.S.C. 154(b) by 517 days.

(21) Appl. No.: 16/096,479

(22) PCT Filed: Jan. 17, 2017

(86) PCT No.: PCT/EP2017/050893
§ 371 (c)(1),
(2) Date: Oct. 25, 2018

(87) PCT Pub. No.: WO2017/186359
PCT Pub. Date: Nov. 2, 2017

(65) Prior Publication Data
US 2019/0134551 A1  May 9, 2019

(30) Foreign Application Priority Data
Apr. 25, 2016 (DE) .......................... 202016102187.1

(51) Int. Cl.
*B01D 46/24* (2006.01)
*B01D 46/00* (2022.01)

(52) U.S. Cl.
CPC ...... *B01D 46/2411* (2013.01); *B01D 46/0001* (2013.01); *B01D 46/2407* (2013.01); *B01D 2265/029* (2013.01); *B01D 2265/04* (2013.01)

(58) Field of Classification Search
None
See application file for complete search history.

(56) References Cited

U.S. PATENT DOCUMENTS

| 3,996,308 A | 12/1976 | Douek |
| 4,105,562 A | 8/1978 | Kaplan et al. |

(Continued)

FOREIGN PATENT DOCUMENTS

| DE | 2638142 A1 | 11/1977 |
| DE | 8715130 U1 | 1/1988 |

(Continued)

OTHER PUBLICATIONS

Permabond Engineering Adhesives, 2015, available at http://www.permabond.com (last visited Nov. 9, 2020). (Year: 2015).*

(Continued)

*Primary Examiner* — Jonathan Miller
*Assistant Examiner* — Gabriel E Gitman
(74) *Attorney, Agent, or Firm* — Berenato & White, LLC

(57) ABSTRACT

Filter element (1), in particular filter cartridge, for filtering exhaust gases or process gases, having a filter body (2) which defines a longitudinal direction (R) and is subdivided along the latter into a plurality of substantially tubular filter body elements (7, 8) which are each connected in pairs at their end portions (9, 10) pointing towards one another, wherein the filter body (2) defines an interior space (5) of the filter element (1), wherein two filter body elements (7, 8) connected together in pairs are screwed together by means of internal and external threads (11, 12) formed at their end portions (9, 10) and corresponding to one another and are additionally glued together in their contact regions by means of an adhesive (13).

27 Claims, 3 Drawing Sheets

(56) References Cited

U.S. PATENT DOCUMENTS

| | | | | |
|---|---|---|---|---|
| 4,894,070 A | * | 1/1990 | Keidel | B01D 46/2407 |
| | | | | 95/280 |
| 4,960,448 A | * | 10/1990 | Zievers | B01D 46/0005 |
| | | | | 55/302 |
| 8,097,154 B2 | | 1/2012 | Dworatzek et al. | |
| 2008/0314012 A1 | * | 12/2008 | Allen | B01D 46/4281 |
| | | | | 55/524 |
| 2016/0130441 A1 | * | 5/2016 | Bushelman | C08L 79/08 |
| | | | | 524/538 |
| 2016/0243482 A1 | | 8/2016 | Blaha et al. | |

FOREIGN PATENT DOCUMENTS

| | | | | |
|---|---|---|---|---|
| DE | 202006011990 U1 | 12/2007 | | |
| DE | 102012107097 A1 | 5/2014 | | |
| DE | 102013016380 A1 | 4/2015 | | |
| DE | 102014011678 A1 | * | 2/2016 | B01D 39/10 |
| DE | 102014011678 A1 | | 2/2016 | |
| EP | 0588525 A1 | 3/1994 | | |
| EP | 0730896 A2 | 9/1996 | | |
| GB | 717128 A | 10/1954 | | |
| GB | 0730896 A2 | * | 9/1996 | B01D 39/2068 |

OTHER PUBLICATIONS

Seaway Bolt & Specials Corp, https://www.seawaybolt.com/faqs, last visited Nov. 7, 2020. (Year: 2015).*

Cotronics Corp., High Temp. Materials Instructional Handbook, 2014, available at https://www.cotronics.com, last visited Nov. 7, 2020. (Year: 2014).*

DE102014011678A1_ENG (Espacenet machine translation of Dunkel) (Year: 2016).*

* cited by examiner

FILTER ELEMENT FOR FILTRATION OF EXHAUST GASES OR PROCESS GASES AND METHOD FOR MANUFACTURING SUCH FILTER ELEMENT

CROSS-REFERENCE TO RELATED APPLICATIONS AND CLAIM TO PRIORITY

This application is a national stage application of International Application No. PCT/EP2017/050893 filed Jan. 17, 2017, which claims priority to German Patent Application No. 202016102187.1 filed Apr. 25, 2016, the disclosures of which are incorporated herein by reference and to which priority is claimed.

FIELD OF THE INVENTION

The invention concerns a filter element, in particular a filter cartridge, for the filtration of exhaust gases or process gases, having a filter body which defines a longitudinal direction and is subdivided along the latter into a plurality of essentially tubular filter body elements which are connected in pairs in each case at end portions pointing towards one another, the filter body defining an interior space of the filter element. Furthermore, the invention concerns a method for the production of such a filter element.

BACKGROUND OF THE INVENTION

Process or exhaust gases occur in the most diverse areas of industry but also in the everyday life of every human being. There are exhaust gases from combustion plants, gas turbines, waste incineration plants and combustion engines, to name but a few examples. Due to environmental, safety and health requirements, such process or exhaust gases, often referred to as raw gases, must be cleaned or catalytically treated. As a result of their production process, such raw gases are often hot gases. For the purification of process or exhaust gases, state-of-the-art filter elements are known which are able to reduce or minimise toxic pollutants contained in the raw gas by means of catalysis and/or to remove solid particles or dust from the raw gas. This is important because some pollutants can cause short-term poisoning if inhaled. On the other hand, fine particles in the ambient air can cause cancer in humans in the medium or long term. Such filter elements are often so-called filter cartridges, which can be part of a larger filter module or filter system. Within such a filter module, the filter cartridges are often suspended at one end.

For a wide variety of reasons, especially for process engineering reasons, long filter elements with a length of several meters, for example, are desirable. This is because with an increasing length of the filter elements, for example, a higher filter performance can be achieved. In order to obtain such long filter elements, it is known to divide a filter body of a filter element defining a longitudinal direction along the longitudinal direction into several essentially tubular filter body elements. The filter body elements are connected in pairs at their mutually facing end sections, so that in particular a hollow cylindrical filter cartridge body is formed.

In the DE 87 15 130, the connection is realised by the filter body elements being pushed into each other at the ends and additionally glued together. Since the filter element is suspended during operation and the gravitational force acts parallel to its longitudinal direction, such an adhesive bond is exposed to high mechanical loads due to the dead weight of the filter body elements. This can lead to the breakage and/or falling off of filter elements.

In order to increase the mechanical stability of such a connection, DE 10 2013 016 380 A1 proposes to provide for an additional outer skeleton. Such an outer skeleton forms a kind of support cage, which consists of ropes, wires, rods and/or plates, for example, and is intended to prevent the filter body elements from breaking off and/or falling off. Although the outer skeleton can relieve the adhesive connection, the installation of such an outer skeleton is very time-consuming and costly.

In EP 0 730 896 A2, the connection is realized by screwing the filter body elements together by means of interacting internal and external threads. Such a screw connection is relatively stable and does not loosen even with a hanging filter element or only with great difficulty. However, a pure screw connection cannot ensure that the separation gap between the filter body elements connected by screw connection is sealed in such a way that no fluids can penetrate from an outer area of the filter element into the interior of the filter element and/or escape from the interior into the outer area. However, this is necessary to achieve a high filter performance.

SUMMARY OF THE INVENTION

The invention is therefore based on the task of providing a filter element of the type mentioned above with an alternatively designed connection between several filter body elements that does not have the disadvantages of the known connections.

This task is solved according to the invention in that two filter body elements connected to one another in pairs are screwed to one another by means of internal and external threads which are formed at their end portions and correspond to each other and are additionally bonded one another in their contact regions by means of an adhesive.

The basic idea of the invention is therefore to provide both types of connection together instead of a pure adhesive connection or a pure screw connection. The filter element according to the invention already has a certain basic stability due to the fact that the filter body elements are screwed together, which makes it possible to put the filter element into operation hanging without the danger that filter body elements become detached and/or fall down. A further mechanical relief of the connection of the filter body elements by additional stabilizing agents, such as a supporting skeleton, is not necessary. Thus, the filter element according to the invention is inexpensive and easy to manufacture. The fact that the filter body elements are additionally glued together increases the stability of their connection even further. The bonding also ensures a fluid-tight connection and thus a high filter performance.

The raw gases filtered with the filter element according to the invention can basically be exhaust gases or process gases of different temperatures. However, the filter element in accordance with the invention is particularly suitable for the filtration of exhaust gases or process gases with temperatures of up to 750° C.

According to one design of the invention, the internal and external threads are conical, in particular slightly conical, wherein the external thread tapers in the direction of an end face of the end portion on which the external thread is formed and the internal thread is correspondingly tapered. A tapered screw thread has the advantage that the first threads of the external thread and the internal thread are pushed axially past each other until the threads come into contact, so that only a few revolutions are required for axial clamping.

The internal and external threads can be threads with an essentially uniform thread pitch. The thread depth of the internal and external threads is advantageously between 5 and 20 mm. The internal and external threads are preferably a trapezoidal thread, a round thread and/or a rectangular thread. Trapezoidal threads have a relatively high friction and can therefore be self-locking so that they do not loosen themselves. Round threads are relatively resistant as they do not have any filigree edges. The internal and external threads can each have a length of 50 to 200 mm in the longitudinal direction of the filter body.

The filter body elements, which are respectively connected in pairs, are advantageously glued together at their end faces and in the contact area of the internal and external threads. In the axial transition regions between two connected filter body elements, the adhesive expediently extends at least partially onto the outer surface and/or inner surface of the filter body. A layer thickness of the adhesive, which is preferably uniform, can be 1 to 5 mm. The last mentioned measures taken on their own or in combination ensure that the separation gap between the connected filter elements is optimally sealed.

It is expedient that the adhesive is such that it cures and/or sinters when heated above a certain limit temperature, wherein the adhesive ceramicizes in particular at 250° C. Since the filter element according to the invention is particularly suitable for the filtration of exhaust gases or process gases with temperatures up to 750° C., as described above, ceramization at 250° C. has the advantage that it can take place automatically when the filter element is put into operation or during operation. In addition, a high mechanical load-bearing capacity and strength is achieved by sintering. The adhesive may contain particles with a particle size of up to 2 mm, preferably 0.1 to 0.5 mm. The adhesive may also be low viscosity and/or an aluminosilicate adhesive and/or a water glass based adhesive.

It is expedient that the filter body elements connected in pairs are flush with one another such that the outer surface and/or the inner surface of the filter body are substantially smooth in the axial transition regions between the two filter body elements. This prevents, for example, dust particles from accumulating on edges or projections during operation of the filter element and impairing further operation of the filter element.

Advantageously, the filter element has the shape of a filter cartridge with an essentially hollow cylindrical filter cartridge body, which is closed at one end, in particular hemispherical, and open at its opposite end. A radially projecting collar may be formed on the open end of the filter cartridge body, in particular a substantially cylindrical collar or a substantially conical collar which tapers in the direction of the closed end of the filter cartridge body. The filter element can be easily attached to the suspension device of a filter module via the collar. Due to the special design of the filter element as a filter cartridge, raw gas to be cleaned can flow from a raw gas chamber through the filter cartridge body into the interior of the filter cartridge during operation of the filter element. The raw gas can be largely freed from dust particles and/or pollutants and can then leave the interior of the filter cartridge at its open end and flow into a clean gas chamber.

Filter body elements preferably have or consist of a vacuum moulded part. The vacuum moulded part can in particular be a fired or unfired vacuum moulded part based on aluminium silicate wool, alkaline earth silicate wool and/or polycrystalline high temperature wool. Using vacuum forming technology, even relatively complicated moulded parts can be produced. At least one catalyst can also be stored in the vacuum moulded part.

The filter body has a length of 1 to 6 m, preferably 4 to 6 m, and/or the filter body elements have a length of 0.5 to 2.5 m each. Particularly with such long filter elements, which in particular have a high dead weight, the ingenious connection of two filter body elements by means of screwing and gluing is an ideal solution.

Preferably the filter body has an outer diameter of 30 to 300 mm and/or a wall thickness of 5 to 30 mm, preferably 10 to 25 mm.

The material of the filter body should have a porosity of 50 to 90%, preferably greater than 70%.

The previously mentioned task of the invention is also solved by a method for the manufacture of a filter element, such as the filter element described above. In order to form a filter body of the filter element, several essentially tubular filter body elements are connected in pairs at their end portions pointing to one another. In accordance with the invention, two filter body elements to be connected in pairs are screwed together by means of internal and external threads formed at their end portion and corresponding to each other and additionally glued together in their contact areas by means of an adhesive.

According to the design of the invention, the filter body elements to be connected in pairs are glued together at their end faces and in the contact area of the internal and external threads. This enables a good sealing of the separating gap between two connected filter body elements against the penetration of fluids. It is advisable to apply the adhesive in the contact areas before the several filter body elements are screwed together in pairs. In this way, the adhesive can be applied in the best possible way in the contact areas. The adhesive can be applied at least partially to the outer surface and/or inner surface of the filter body in the axial transition areas between two connected filter body elements. This also contributes to a good sealing of the separating gap. It is advantageous to apply the adhesive with a layer thickness of 1 to 5 mm, preferably evenly. An adhesive can be used which cures and/or sinters when heated above a certain temperature limit, whereby the adhesive ceramics at 250° C. in particular. It is advantageous to use an adhesive which contains particles which, in particular, have a particle size of up to 2 mm, preferably 0.1 to 0.5 mm. It is also possible to use an adhesive that is low viscosity and/or an aluminosilicate adhesive and/or a water glass based adhesive.

The filter body elements are preferably designed in such a way that in each case two filter body elements to be connected are flush with one another, so that the outer surface and/or the inner surface of the filter body are essentially smooth in the axial transition regions between the two filter body elements.

With regard to other possible characteristics of the filter element and advantages of the characteristics of the inventive method of manufacturing a filter element, reference is made to the description of the inventive filter element in order to avoid repetitions.

With the filter element described above, for the first time a filter element with an alternatively designed connection between several filter body elements is provided, which does not show the disadvantages of the previously known connections.

BRIEF DESCRIPTION OF THE DRAWINGS

Further characteristics and advantages of the present invention become clear by the following description of a design form of the filter element according to the invention with reference to the enclosed drawing. In it is.

DETAILED DESCRIPTION OF THE PREFERRED EMBODIMENT(S)

Figure 1:
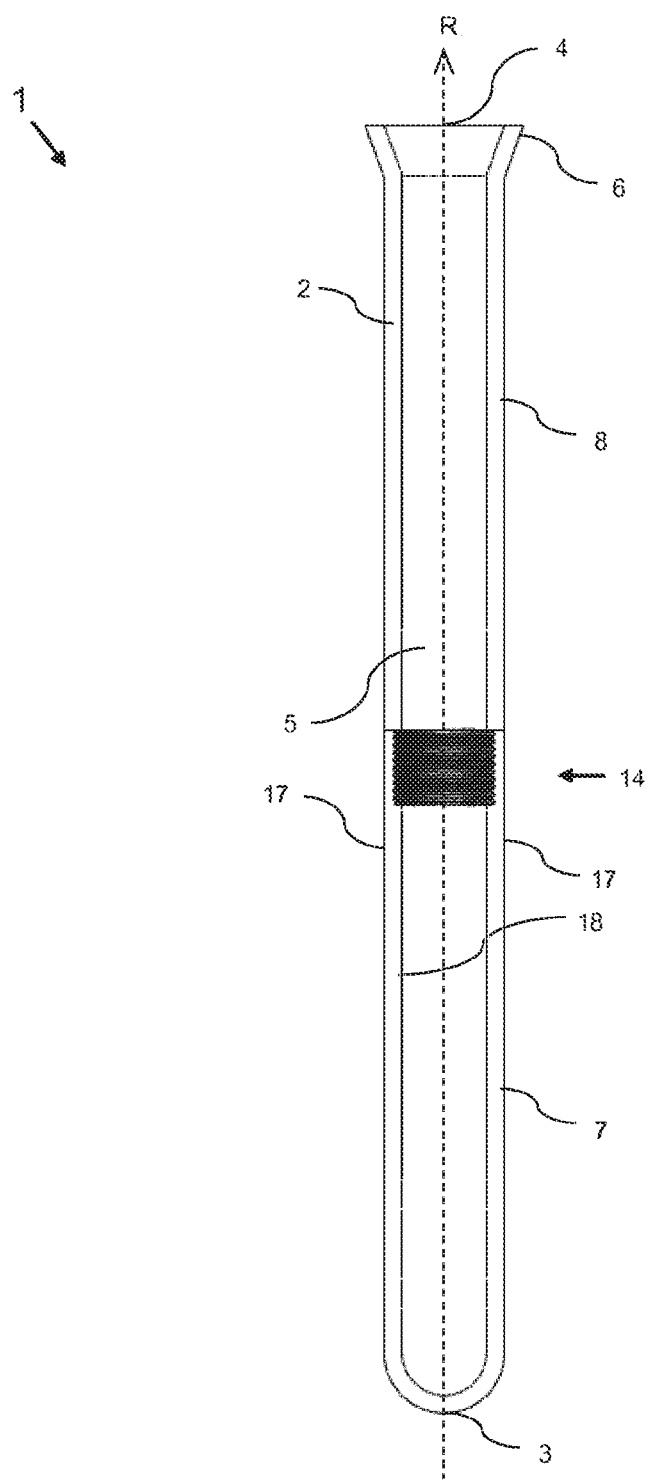
FIG. 1 a schematic view of a filter element according to the invention according to a form of the present invention.

FIGS. 1 to 4 show schematic views of a filter element 1 according to the invention for the filtration of exhaust gases or process gases according to a design of the present invention. As can be seen from FIG. 1, the filter element 1 is formed in the form of a filter cartridge and has a substantially hollow cylindrical filter body 2, which is hemispherically closed at one, lower end 3 and open at its opposite, upper end 4 and defines an interior space 5 of the filter element 1. At the open end 4 of the filter body 2 a radially projecting conical collar 6 is formed, which tapers in the direction of the closed end 3 of the filter body 2.

The filter body 2 defines a longitudinal direction R and is divided along this into two essentially cylindrical tubular filter body elements 7, 8, which are connected to each other at their end portions 9, 10 pointing towards each other. For this purpose, the filter body elements 7, 8 have corresponding internal and external threads 11, 12 at their mutually facing end portions 9, 10, which screw them directly together. In addition, the end portions 9, 10 are glued together in their contact areas by means of an adhesive 13. The provision of both types of connection, i.e. gluing and screwing, is advantageous. In contrast to a pure bonding of the filter body elements 7, 8, a greater stability of the connection is achieved. Compared to a pure screw connection, it is ensured that the separating gap between the filter body elements 7, 8 connected by a screw connection is sealed against the penetration of fluids.

The two filter body elements 7, 8 are made of a solid (i.e., of uniformly close and coherent texture not interrupted by a break or openings, not perforated) porous material and are designed as vacuum moulded parts with a catalyst embedded. The vacuum moulded parts can be fired or unfired vacuum components based on aluminium silicate wool, alkaline earth silicate wool and/or polycrystalline high-temperature wool. Even if a catalyst is stored in the vacuum moulded parts in the present design form, it should be clear that it is also conceivable to have designs in which no such catalyst is stored in the vacuum moulded parts. Vacuum moulded parts can also be merely a component of filter body 2 or filter body 2 can do entirely without vacuum moulded parts. In general, the material of the filter body 2 should have a porosity of 50 to 90%, preferably greater than 70%.

The filter body 2 can normally be 1 to 6 m long, preferably 4 to 6 m, for example. As shown in FIG. 1, each of the two filter body elements 3, 4 is approximately half the total length of the filter body 2. Of course, it is also possible in other designs not shown here to form the filter body 2 from more than two filter body elements 7, 8, so that each filter body element 7, 8 constitutes a smaller part of the total length of the filter body 2. The filter body 2 can have an outer diameter of 30 to 300 mm and/or a wall thickness of 5 to 30 mm, preferably 10 to 25 mm.

Figure 3:
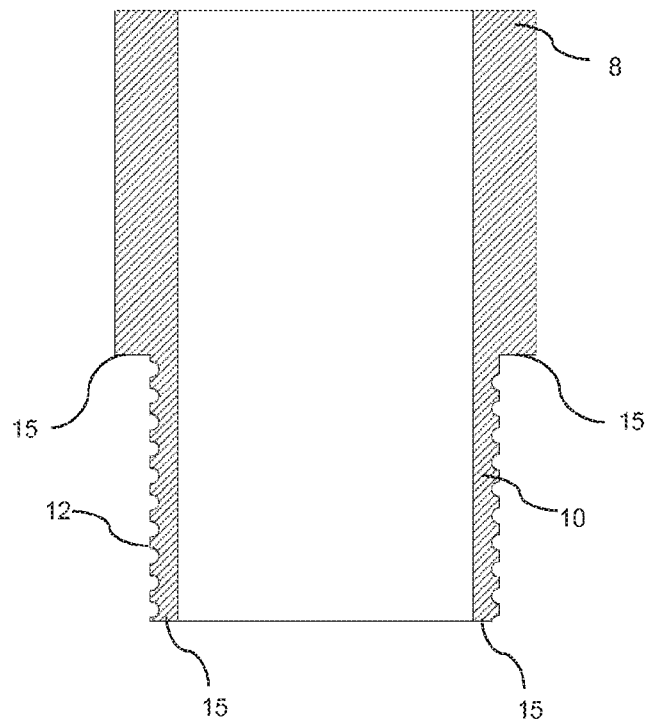
FIG. 3 a schematic cross-sectional view of a part of a first filter body element of the invention filter element as shown in FIG. 1 in a non-screwed and non-bonded configuration.
Figure 4:
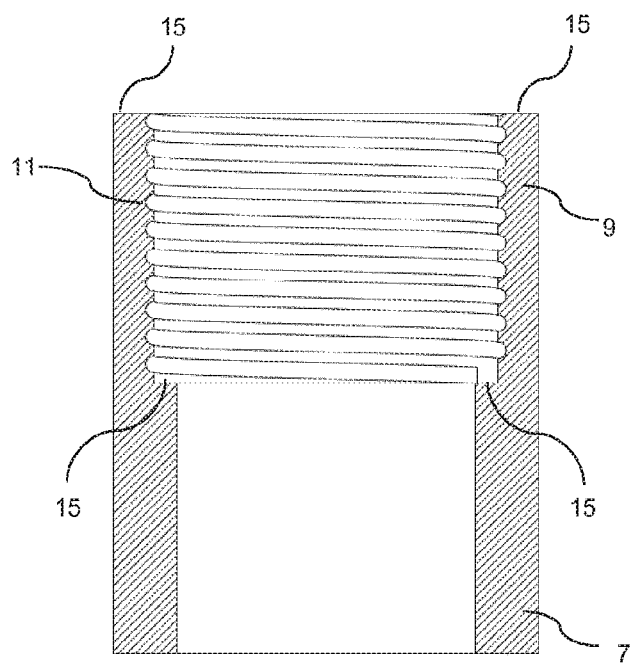
FIG. 4 a schematic cross-sectional view of a part of a second filter body element of the invention filter element according to FIG. 1 in a non-screwed and non-bonded configuration.

FIGS. 3 and 4 in particular show how the two filter body elements 7 and 8 of this design example of an inventive filter element 1 are screwed together. For the purpose of a clearer representation, parts of the two filter body elements 7, 8 are shown in FIGS. 3 and 4 in a non-bolted and non-bonded configuration. The internal and external threads 11, 12 are threads with an essentially uniform thread pitch. These each have a length of 50 to 200 mm in the longitudinal direction R here. The thread depth of the internal and external threads 11, 12 is between 5 and 20 mm. In other designs not shown here, the internal and external threads 11, 12 can also be conical. The internal and external threads 11, 12 of the present design are partly similar to a round thread. In principle, internal and external threads 11, 12 can also be trapezoidal or flat threads.

Figure 2:
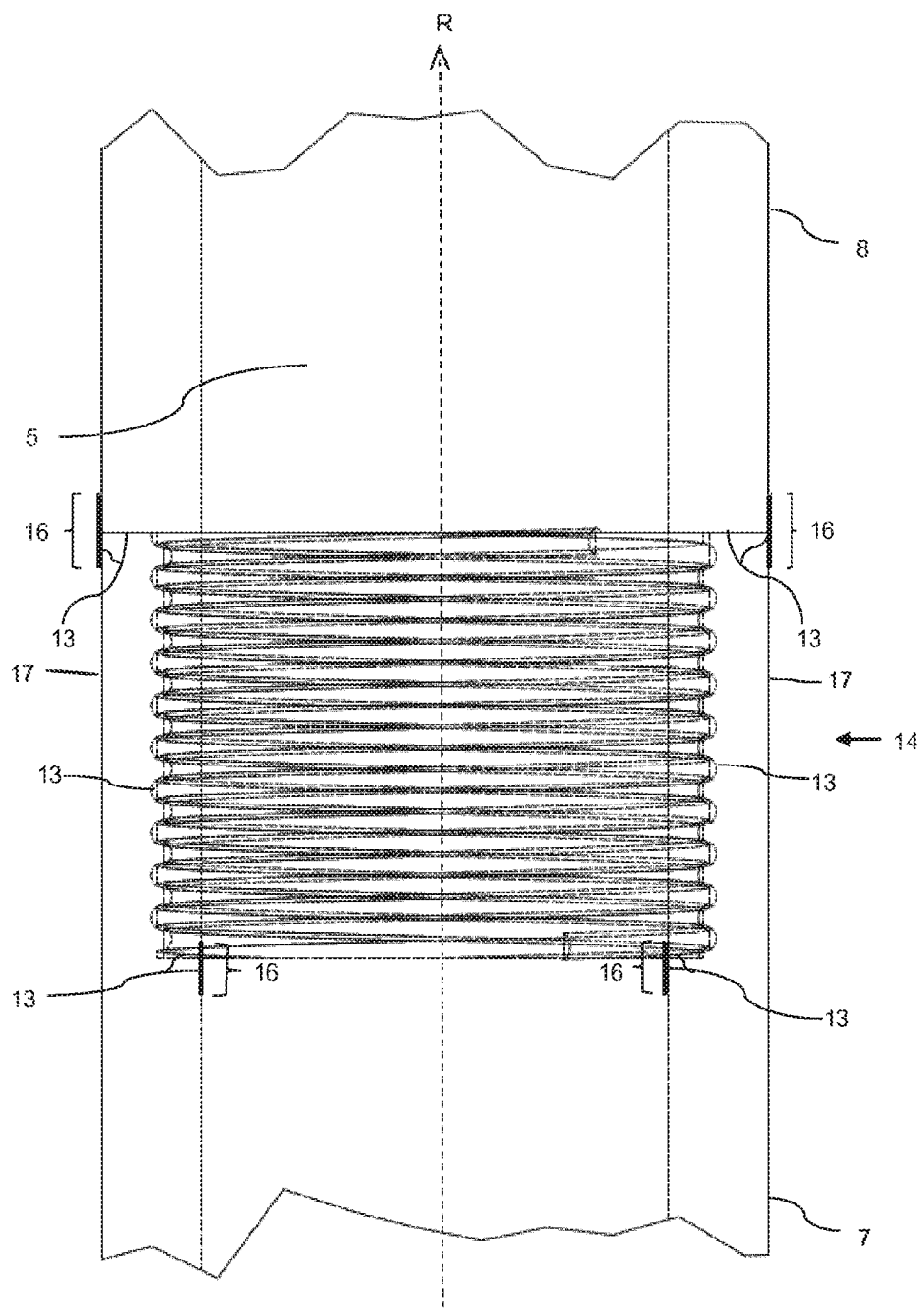
FIG. 2 a schematic zoom view of a connection area of the invention filter element according to FIG. 1.

The zoom view of a connection area 14 of the invention filter element 1 shown in FIG. 2 shows that the two filter body elements 7, 8 are bonded to each other in their contact areas, i.e. in this design example at their end faces 15 and in the contact area of the internal and external threads 11, 12, in their contact areas. In addition, the adhesive 13 in the axial transition areas 16 between the two connected filter body elements 7, 8 extends at least partially onto the outer surface 17 and inner surface 18 of the filter element 1. The layer thickness of the adhesive 13 is uniform and can, for example, be 1 to 5 mm. In this design example, the adhesive 13 is designed in such a way that it sinters when heated above a certain limit temperature. This results in a high mechanical load capacity and strength. In other designs not shown here, the adhesive 13 may also or alternatively also contain, for example, particles, be low viscosity, an aluminosilicate adhesive and/or a water glass based adhesive.

As can also be seen from FIG. 2, the two connected filter body elements 7, 8 are flush with each other in such a way that the outer surface 17 and the inner surface 18 of the filter body 2 are essentially smooth in the axial transition areas 16 between the two filter body elements 7, 8, i.e. without larger edges or projections.

With regard to further features or advantages of the features or feature combinations of the previously described design form of a filter element conforming to the invention, reference is made to the general description section in order to avoid repetitions.

REFERENCE CHARACTER LIST a. filter element
b. filter body
c. closed end
d. open end
e. interior space
f. collar
g. filter body element
h. filter body element
i. end portion
j. end portion
k. internal thread
l. external thread
m. adhesive
n. Connection area
o. end faces
p. axial transition area
q. outer surface
r. inner surface

The invention claimed is:

1. A filter element (1) for filtering exhaust gases or process gases, the filter element comprising a filter body (2) defining a longitudinal direction (R) and made of a solid porous material, the filter body (2) including a plurality of tubular filter body elements (7, 8) disposed along the longitudinal direction (R), of the filter body elements (7, 8) connected in pairs at end portions (9, 10) thereof pointing towards one another, the filter body (2) defining an interior space (5) of the filter element (1), two of the filter body elements (7, 8) threadedly connected to one another in pairs so that the filter body elements (7, 8) are directly screwed to one another by an internal thread and an external thread (11, 12) formed at the end portions (9, 10) of the filter body elements (7, 8), the internal and external threads (11, 12) corresponding to one another, the end portions (9, 10) additionally bonded to one another in contact regions thereof by an adhesive (13),
  wherein the adhesive (13) is configured to cure and/or sinter when heated above a specific limit temperature, and wherein the adhesive (13) ceramicizes at 250° C.

2. The filter element (1) according to claim 1, wherein the internal thread and the external thread (11, 12) are conical, wherein the external thread (12) tapers in the direction of an end face of the end portion (6) on which the external thread (12) is formed, and wherein the internal thread (10) is correspondingly tapered.

3. The filter element (1) according to claim 1, wherein the thread and the external thread (11, 12) are threads with a substantially uniform thread pitch.

4. The filter element (1) according to claim 1, wherein a thread depth of the internal thread and the external thread (11, 12) is in each case 5 to 20 mm.

5. The filter element (1) according to claim 1, wherein the internal thread and the external thread (11, 12) are each one of a trapezoidal thread, a round thread and a rectangular thread.

6. The filter element (1) according to claim 1, wherein the internal thread and the external thread (11, 12) each have a length of 50 to 200 mm in the longitudinal direction (R).

7. The filter element (1) according to claim 1, wherein the filter body elements (7, 8), which are respectively connected to one another in pairs, are adhesively bonded to one another at end faces (15) thereof and in an engagement region of the internal thread and the external thread (11, 12).

8. The filter element (1) according to claim 1, wherein the adhesive (13) extends in axial transition regions (16) between the two connected filter body elements (7, 8) at least partially onto at least one of an outer surface (17) and an inner surface (18) of the filter body (2).

9. The filter element (1) according to claim 1, wherein a layer thickness of the adhesive (13) is 1 to 5 mm.

10. The filter element (1) according to claim 1, wherein the adhesive (13) has particles having a particle size of up to 2 mm.

11. The filter element (1) according to claim 1, wherein the adhesive (13) is at least one of an alumosilicate adhesive and a waterglass-based adhesive.

12. The filter element (1) according to claim 1, wherein the filter body elements (7, 8), which are connected to one another in pairs, are flush with one another in such a way that at least one of an outer surface (17) and an inner surface (18) of the filter body (2) is smooth in axial transition regions (16) between the two filter body elements (7, 8).

13. The filter element (1) according to claim 1, wherein the filter element (1) has a shape of a filter cartridge, wherein the filter body (2) is hollow and cylindrical, and wherein the hollow cylindrical filter body (2) has a closed end (3) and an open end (4) opposite to the closed end (3).

14. The filter element (1) according to claim 13, wherein a radially projecting collar (6) is integrally formed on the open end (4) of the filter cartridge body (2), and wherein the radially projecting collar (6) is a cylindrical collar or a conical collar which tapers in the direction of the closed end (3) of the filter cartridge body (2).

15. The filter element (1) according to claim 1, wherein the filter body elements (7, 8) comprise a vacuum molded part based on one of aluminum silicate wool, alkaline earth silicate wool and polycrystalline high-temperature wool.

16. The filter element (1) according to claim 15, wherein at least one catalyst is incorporated in the vacuum molding.

17. The filter element (1) according to claim 1, wherein the filter body (2) has a length of 1 to 6 m, and wherein each of the filter body elements (7, 8) has a length of 0.5 to 2.5 m.

18. The filter element (1) according to claim 1, wherein the filter body (2) has an outer diameter of 30 to 300 mm and/or a wall thickness of 5 to 30 mm.

19. The filter element (1) according to claim 1, wherein the material of the filter body (2) has a porosity of 50 to 90%.

20. A method for producing a filter element (1), the method comprising the steps of:
  providing a plurality of tubular filter body elements (7, 8) each made of a solid porous material;
  threadedly connecting the tubular filter body elements (7, 8) in pairs at end portions (9, 10) thereof pointing to one another by directly screwing two of the filter body elements (7, 8) to be connected to one another in pairs by an internal thread and an external thread (11, 12) formed at the end portions (9, 10) thereof and corresponding to one another; and
  gluing the end portions (9, 10) of the filter body elements (7, 8) to one another in contact regions thereof by an adhesive (13),
  wherein the adhesive (13) is configured to cure and/or sinter when heated above a certain limit temperature, and wherein the adhesive (13) ceramicizes at 250° C.

21. The method according to claim 20, wherein the filter body elements (7, 8) to be connected to one another in pairs in each case are adhesively bonded to one another at end faces (15) thereof and in an engagement region of the internal thread and the external thread (11, 12).

22. The method according to claim 20, wherein the adhesive (13) is applied in the contact regions before the plurality of the filter body elements (7, 8) are each screwed together in pairs.

23. The method according to claim 20, wherein the adhesive (13) is applied at least partially to at least one of an outer surface (17) and an inner surface (18) of the filter body (2) in axial transition regions (16) between the two connected filter body elements (7, 8).

24. The method according to claim 20, wherein the adhesive (13) is applied with a layer thickness of 1 to 5 mm.

25. The method according to claim 20, wherein the adhesive (13) comprises particles having a particle size of up to 2 mm.

26. The method according to claim 20, wherein the adhesive (13) is at least one of an aluminosilicate adhesive and a water glass based adhesive.

27. The method according to claim 20, wherein the filter body elements (7, 8) to be connected are flush with one another, so that at least one of an outer surface (17) and an inner surface (18) of the filter body (2) is smooth in axial transition regions (16) between the two filter body elements (7, 8).

\* \* \* \* \*